United States Patent Office 3,726,800
Patented Apr. 10, 1973

3,726,800
STABILIZATION OF PEROXYDISULFATE AND
PEROXYDIPHOSPHATE SOLUTIONS
Robert E. Yelin, Willingboro, and Ralph F. Villiers,
Trenton, N.J., assignors to FMC Corporation, New
York, N.Y.
No Drawing. Filed Aug. 21, 1970, Ser. No. 66,058
Int. Cl. C11d 7/54
U.S. Cl. 252—95                                       4 Claims

ABSTRACT OF THE DISCLOSURE

Aqueous solutions of peroxydisulfates and peroxydiphosphates are stabilized by the addition of urea, molecular oxygen, a vinyl monomer, or other solution-dispersible agent which is reactive with free radicals.

BACKGROUND OF THE INVENTION

Field of the invention

This invention relates to the stabilization of aqueous alkaline solutions of peroxydisulfates and peroxydiphosphates.

Review of the prior art

Alkaline solutions of peroxydisulfates (often called persulfates) have been used as desizing agents for textiles containing any one of the common sizing agents, such as starch, polyvinyl alcohol, carboxyl methyl cellulose, and polyacrylates. The treatment has the advantage that it combines desizing with an alkaline scouring action, as compared with enzyme or bromite desizing, which requires a separate alkaline scouring step. Recommended practices for alkaline peroxydisulfate combined desizing and scouring are outlined in FMC Corporation's Inorganic Chemicals Division Technical Data Bulletin No. 124 entitled "Desizing with FMC Sodium Persulfate," released in April of 1966.

The process involves treating greige goods with an aqueous solution containing from about 0.3 to 5% of sodium (or other) peroxydisulfate 0.5 to 5.0% of caustic soda (all percentages based on weight of material being treated) and a wetting agent, and then either holding the material for 4 to 8 hours at under 110° F., or preferably raising the temperature to near the boiling point for about 1 hour at ambient pressure or for a few minutes at elevated pressures and the higher temperatures possible at those pressures. Excellent desize-scouring results are obtained.

A major problem has arisen in this process. Once the saturating bath becomes contaminated with reactive impurities—such as sizing, chelating or wetting agents and heavy-metal ions—the peroxydisulfate loses its active oxygen rapidly at temperatures above 110° F.; hence, the temperature at which the bath is held should be below this point. Saturation by padding is much more efficient at higher temperatures, and the industry has resisted the use of the necessary low temperatures in the peroxydisulfate-alkali process.

In our copending patent application Ser. No. 66,055, entitled "Desize-Scouring of Textiles with Alkaline Peroxydiphosphate Solutions" and filed Aug. 21, 1970, and allowed Aug. 9, 1971, we have shown that higher padding temperatures can be obtained by replacing peroxydisulfate with peroxydiphosphate, but even the peroxydiphosphates suffer some degradation in the course of the padding operation.

OBJECT OF THE INVENTION

The principal object of the present invention is to increase the stability of alkaline peroxydisulfate and peroxydiphosphate solutions contaminated with materials which catalyze decomposition of the peroxy compound without interfering with their activity in the desize-scouring operation.

STATEMENT OF THE INVENTION

We have discovered that aqueous alkaline solutions of peroxydisulfates and peroxydiphosphates can be stabilized at elevated temperatures between about 100 and 180° F., without reducing the activity of the chemicals at higher temperatures above about 200° F., by using as stabilizer a water-dispersible material which reacts with free radicals, for example urea, molecular oxygen and other paramagnetic gases such as nitrogen oxides, polymerizable water-dispersible vinyl compounds such as methyl methacrylate, acrylic acid, vinyl acetate and acrylamide, and aromatic amides such as acetanilide. Surprisingly, stability at the lower temperatures is increased by a factor of up to ten or twelve times, while the inhibiting effect of the additive is minor at the boiling point.

DETAILED DESCRIPTION OF THE INVENTION

Typically, the baths are designed for the intended purpose by combining a caustic alkali, generally sodium hydroxide for cost reasons, with the peroxydisulfate, and, if desired, a wetting agent to speed up fabric pick-up. The concentrations are selected to represent a desired percentage of the material treated, and are reported as percent OWM (on weight of material); where 100% pick-up of treating liquor is obtained, the percentages become the same for the bath as percent OWM. Typically, the caustic soda content of the baths is about 0.3 to 5%, the peroxydisulfate or peroxydiphosphate about 0.5 to 5%, with wetting agent from 0.0 to 2.0%.

The stability imparted by our invention permits the padding operation to be carried out at temperatures from 40 to 60° F. higher than in the absence of stabilizing agent, thereby increasing saturating efficiency and permitting rapid saturation by padding. At the same time, the activity of the scour-desize is not impaired since the inhibiting action of the stabilizers is sharply reduced at temperatures of the order of 200° F. and higher.

The amount of inhibitor required depends on the inhibitor used.

Any material dispersible in the aqueous solution which reacts with free radicals in useful; but the amount necessary depends on the free-radical reactivity. Thus, urea, which reacts rather inefficiently with free radicals, must be used at concentrations of 5 to 10%. Paramagnetic gases such as free oxygen can be efficiently dispersed by bubbling through the solution. Polymerizable vinyl compounds are most efficient, so that amounts of as low as a tenth of a percent give satisfactory results.

We have used as stabilizers urea, paramagnetic gases including oxygen and nitrogen oxides, vinyl monomers including vinyl acetate, acrylic and methacrylic acids, their esters and amides and acetanilide.

The inhibitors are useful not only with solutions contaminated with sizing agents, but also in retarding decomposition induced by other means, such as by wetting and sequestering agents, and metallic ions.

SPECIFIC EXAMPLES OF THE INVENTION

The following specific examples of the invention are given by way of illustration and not by way of limitation.

Example 1

A solution containing 0.5% disodium peroxydisulfate, 0.2% potato starch and 2.0% sodium hydroxide has a half-life of decomposition of 25 minutes at 140° F. The half-life of the peroxydisulfate is increased to 106 minutes with the addition of 10% urea.

Example 2

The peroxydisulfate solution of Example 1 has its half-life increased to 148 minutes at 140° F. with the addition of 1.0% acrylic acid.

Example 3

The peroxydisulfate solution of Example 1 has its half-life increased to 240 minutes at 140° F. with the addition of 0.5% methyl methacrylate.

Example 4

The peroxydisulfate solution of Example 1 has its half-life increased to 305 minuates at 140° F. with the addition of 0.25% methacrylic acid.

Example 5

The peroxydisulfate solution of Example 1 (300 ml.) is completely decomposed within 2 hours at 140° F., whereas with the addition of compressed air (1180 cc./minute) the decomposition is held to between 15 and 20%.

Example 6

A solution containing 0.5% tetrapotassium peroxydiphosphate, 0.2% potato starch and 2.0% sodium hydroxide has a half-life of decomposition of 47 minutes at 180° F. The half-life of the peroxydiphosphate is increased to 190 minutes with the addition of 1.0% acrylic acid.

All of the above solutions are useful in desize-scouring of textiles, since at temperatures of 200° F. or higher the peroxy compound again becomes very active.

While the example are directed particularly to materials useful in desize-scouring of textiles, it is obvious that the stabilizing effect of our additives can be used wherever it is desirable to stabilize aqueous peroxydisulfate or peroxydiphosphate solutions.

Obviously, the examples can be multiplied indefinitely without departing from the scope of the invention as defined in the claims.

We claim:

1. A stabilized aqueous alkaline solution of a peroxygen chemical of the group consisting of peroxydisulfates and peroxydiphosphates which solution contains impurities which catalyze the decomposition of the peroxygen, and dispersed in the solution in stabilizing amounts a stabilizer which reacts with free radicals and is selected from the group consisting of urea, molecular oxygen and nitrogen oxides, polymerizable water-dispersible vinyl compounds and acetanilide, the stabilizing amount being 5 to 10% for urea, that obtained by bubbling gas through the liquid for the molecular oxygen and nitrogen oxide gases, and at least about 0.1% for polymerizable vinyl compounds.

2. The composition of claim 1, in which the stabilizer is a polymerizable water-dispersible vinyl compound.

3. The composition of claim 1, in which the stabilizer is molecular oxygen obtained by bubbling it through the solution.

4. The composition of claim 1, in which the stabilizer is a polymerizable water-dispersible vinyl compound selected from vinyl acetate, acrylic and methacrylic acid, and the esters and amides of acrylic and methacrylic acid.

References Cited

UNITED STATES PATENTS

| | | | |
|---|---|---|---|
| 2,730,428 | 1/1956 | Lindner | 252—95 X |
| 3,480,557 | 11/1969 | Shiraeff | 8—111 X |
| 3,463,733 | 8/1969 | Achenbach | 252—148 X |

FOREIGN PATENTS

| | | | |
|---|---|---|---|
| 1,120,996 | 7/1968 | Great Britain | 256—99 |

MAYER WEINBLATT, Primary Examiner

U.S. Cl. X.R.

8—111; 252—186